(12) United States Patent
Frizzell

(10) Patent No.: US 11,498,093 B2
(45) Date of Patent: Nov. 15, 2022

(54) APPARATUS FOR DISPENSING CURABLE MATERIAL INTO A CABLE GLAND

(71) Applicant: CMP PRODUCTS LIMITED, Newcastle upon Tyne (GB)

(72) Inventor: Lee Frizzell, Cramlington (GB)

(73) Assignee: CMP PRODUCTS LIMITED, Newcastle upon Tyne (GB)

( * ) Notice: Subject to any disclaimer, the term of this patent is extended or adjusted under 35 U.S.C. 154(b) by 276 days.

(21) Appl. No.: 16/647,283

(22) PCT Filed: Jun. 27, 2018

(86) PCT No.: PCT/GB2018/051791
§ 371 (c)(1),
(2) Date: Mar. 13, 2020

(87) PCT Pub. No.: WO2019/053395
PCT Pub. Date: Mar. 21, 2019

(65) Prior Publication Data
US 2020/0269273 A1 Aug. 27, 2020

(30) Foreign Application Priority Data

Sep. 18, 2017 (EP) ..................................... 17191645
Feb. 19, 2018 (GB) ..................................... 1802640

(51) Int. Cl.
*H02G 15/013* (2006.01)
*H02G 15/04* (2006.01)
(Continued)

(52) U.S. Cl.
CPC .. *B05C 17/00553* (2013.01); *B05C 17/00586* (2013.01); *H02G 15/003* (2013.01);
(Continued)

(58) Field of Classification Search
CPC ........ B05C 17/00553; B05C 17/00586; H02G 15/003; H02G 15/013; H02G 15/04; H02G 15/046
(Continued)

(56) References Cited

U.S. PATENT DOCUMENTS

2004/0159678 A1* 8/2004 Botrie .................. B65D 81/325
222/459
2011/0192482 A1* 8/2011 Baltes ..................... F15B 1/103
138/30

(Continued)

FOREIGN PATENT DOCUMENTS

EP 2287084 A1 2/2011
GB 765082 A 1/1957
(Continued)

OTHER PUBLICATIONS

International Search Report & Written Opinion dated Sep. 20, 2018.

*Primary Examiner* — Timothy J Thompson
*Assistant Examiner* — Michael F McAllister
(74) *Attorney, Agent, or Firm* — Billion & Armitage

(57) ABSTRACT

A dispenser apparatus (10) for dispensing curable liquid material into a space in a cable gland is disclosed. The apparatus comprises a housing (12) for separately storing of components of a curable liquid material and provided with a respective first outlet (14) for each component. A mixing chamber (16) mixes the components to cause curing of the curable liquid material and has an inlet (18) for receiving the components from the first outlets, and a second outlet (20) for the mixed components. A plunger (22) urges the components out of storage chambers of the housing via the first outlets and into the mixing chamber via the inlet. The dispenser apparatus is adapted to be located in a body of a cable gland such that the mixed components are dispensable (Continued)

from, the second outlet into a space defined by the body and a cable extending through the body.

19 Claims, 17 Drawing Sheets

(51) Int. Cl.
  *B05C 17/005* (2006.01)
  *H02G 15/00* (2006.01)
(52) U.S. Cl.
  CPC ........... *H02G 15/013* (2013.01); *H02G 15/04* (2013.01); *H02G 15/046* (2013.01)
(58) Field of Classification Search
  USPC ....................................................... 174/650
  See application file for complete search history.

(56) References Cited

U.S. PATENT DOCUMENTS

| | | | |
|---|---|---|---|
| 2013/0026182 A1* | 1/2013 | Habibi-Naini | B05C 17/00553 222/326 |
| 2014/0124536 A1* | 5/2014 | Pappalardo | B05C 17/00553 222/137 |
| 2017/0302063 A1* | 10/2017 | Proud | B29C 70/682 |
| 2019/0115743 A1* | 4/2019 | Portillo Gallego | H02G 3/0675 |

FOREIGN PATENT DOCUMENTS

| | | | |
|---|---|---|---|
| GB | 2501329 A | 10/2013 | |
| GB | 2513387 A | 10/2014 | |

\* cited by examiner

US 11,498,093 B2

APPARATUS FOR DISPENSING CURABLE MATERIAL INTO A CABLE GLAND

This application is a National Stage Application of PCT/GB2018/051791, filed on Jun. 27, 2018, which claims benefit of application Ser. No. 17/191,645.5, filed on Sep. 18, 2017 in Europe, and Application No. 1802640.1, filed on Feb. 19, 2018 in Great Britain and which applications are incorporated herein by reference. A claim of priority to all, to the extent appropriate, is made.

INTRODUCTION

The present disclosure relates to a dispensing apparatus for dispensing curable material into a cable gland, and relates particularly, but not exclusively, to a toroidal dispenser arranged to surround cables passing through a cable gland for dispensing curable resin material to seal an interior of the cable gland.

BACKGROUND

Many cable glands for use in connecting a cable to an enclosure in hazardous areas need to be filled with a curable liquid material which provides a barrier against the effects of an explosion occurring within the enclosure to which the cable gland is attached. The barrier is typically formed from a two-part curable liquid material consisting of a resin and an activator or hardener which are mixed and injected, with a syringe-like device, into the cable gland interior to surround the cable or cables passing through the cable gland.

This arrangement suffers from a number of disadvantages. The known syringe-like injecting devices are subject to the capabilities of a user, who is relied upon to introduce the correct amount of mixed curable material into the correct location inside the cable gland. In addition, a dispensing part of the injecting device must be inserted from the exterior of the cable gland into the space into which the curable material is to be introduced. This often necessitates disturbance of the cores of the cable to allow insertion of the dispensing part between the cores, which must then be rearranged after the curable material has been introduced and the dispensing part removed. This involves the risk of detrimentally affecting the bond between the cured material and the cores of the cable. Furthermore, one or more of the components can contain hazardous materials, exposure to which should be minimised as far as practically feasible. It is also difficult to sufficiently accurately locate the curable liquid material to minimise the formation of air voids in the curable material, which can reduce the effect of the cable gland in the event of an explosion.

Preferred embodiments of the present disclosure-seek to overcome one or more of the above disadvantages of the prior art.

STATEMENTS OF INVENTION

According to a first aspect of the present disclosure, there is provided a dispenser apparatus for dispensing curable liquid material into a space between a connector and an elongate object extending through the connector, the apparatus comprising:

storage means for separately storing a plurality of components of a curable liquid material and comprising a plurality of storage chambers each adapted to store a respective component and provided with a respective first outlet for said component; and mixing means for mixing the components to cause curing of the curable liquid material and comprising at least one inlet for receiving the components from the first outlets, and at least one second outlet for the mixed components;

wherein the dispenser apparatus is adapted to be located in a body of a connector such that the mixed components are dispensable from at least one said second outlet into a space defined by the body and an elongate object extending through the body.

By providing a dispenser apparatus as defined above, the advantage is provided that the quantity of curable liquid material to be introduced into the space may be controlled more effectively, thereby improving the quality of bond between the connector and the elongate object. In addition, by dispensing the curable material from a dispenser apparatus located within the connector, this provides the advantage of avoiding the necessity of inserting a dispensing part into the space from the exterior of the connector, thereby avoiding the necessity of disturbing cores of a cable when the elongate object is a cable, so that the cores do not need to be rearranged after the curable material has been dispensed. This in turn minimises the risk of disturbance of the cores having a detrimental effect on the quality of bond provided by the cured material. Furthermore, by introducing the curable material from a dispenser apparatus located within the connector, air is more effectively expelled from the space, thereby enabling the formation of air voids in the curable liquid material to be minimised, and improving the reliability of the bond formed by the cured material.

The apparatus may be adapted to dispense the mixed components into the space as a result of mounting a first part of the body to a second part of the body.

This enables dispensing of the curable material to take place within a closed connector, thereby providing the advantages of ensuring delivery of the curable material to a desired location without requiring the connector to be disassembled, or requiring the dispensing apparatus to be subsequently removed, and preventing air gaps forming within the curable material.

The apparatus may be adapted to urge the components out of a plurality of said storage chambers via the first outlets and into the mixing means via at least one inlet as a result of mounting a first part of the body to a second part of the body.

This provides the advantage of making use of the apparatus to fill a cable gland more reliable.

The storage means may be compressible as a result of mounting a first part of the body to a second part of the body.

This provides the advantage of making a cable gland incorporating the apparatus more compact.

The storage means may be compressible in an axial direction of the cable gland.

At least part of the storage means may have a bellows-like cross section in a plane including a longitudinal axis of the cable gland.

This provides the advantage of enabling better control of axial compression of the storage means.

The apparatus may further comprise dispenser means for urging the components out of the storage chambers via the first outlets and into the mixing means via at least one inlet.

The dispenser means may comprise at least one displacement member slidably located in a respective storage chamber and adapted to move relative to the chamber as a result of mounting the first part of the body to the second part of the body, to displace a component in the chamber out of the respective first outlet.

This enables a simple, syringe-like dispensing action to dispense the curable material, thereby reducing the complexity of the device and providing the advantage of reducing manufacturing costs.

The mixing means may comprise a labyrinthine structure presenting a tortuous path to the components between at least one inlet and at least one second outlet.

This provides the advantage of ensuring that the components are optimally mixed prior to dispensing into the space, thereby providing a more homogenous mixture which is more likely to achieve desired properties upon curing.

The mixing means may be adapted to be at least partially filled with curable liquid material after dispensing of the mixed components from at least one second outlet.

This provides the advantage of reducing waste, since disposal of the used mixing means is no longer necessary.

The apparatus may further comprise an aperture therethrough for receiving an elongate object.

This enables the dispensing apparatus to surround the elongate object within the connector, thereby enabling the apparatus to fit simply into the connector and providing the advantage of increasing the ease of arranging the apparatus in situ.

Relative volumes of the storage chambers may be arranged in proportion to volumes of respective components required for a desired mixing ratio of the components.

This provides the advantage that an optimal mixing ratio of the components may be more easily and consistently achieved.

The apparatus may further comprise barrier means for preventing flow of fluid through at least one first outlet, and access means for enabling flow of fluid through at least one first outlet.

This provides the advantage that the fluid components may be stored in the storage means prior to use of the apparatus, and that the components are only permitted to exit the storage means when desired.

The barrier means may comprise at least one membrane.

This provides the advantage of providing a simple and inexpensive way of preventing the components from leaving the storage means until desired.

At least one said membrane may be adapted to burst as a result of mounting a first part of the body to a second part of the body.

The access means may comprise puncturing means for puncturing the barrier means.

This provides the advantage of providing a simple and inexpensive way of enabling the components to exit the storage means.

The puncturing means may comprise at least one protrusion arranged around a periphery of an inlet.

This provides the advantage of simplifying the manufacture of the device.

At least one second outlet may be arranged to dispense the mixed curable components into the space in a radially-inward direction.

This provides the advantage that mixed components are dispensable directly to a central location of the space of the connector, thereby filling the space in a more efficient manner, and also enabling locations inaccessible from the exterior of the connector to be reached.

According to a second aspect of the present disclosure, there is provided a connector comprising a dispensing apparatus as defined above.

The connector may further comprise a body including a first part and a second part, wherein the first part is mountable to the second part. The first part may be threadably mountable to the second part.

The connector may be a cable gland.

According to a third aspect of the present disclosure, there is provided a connector assembly, comprising: a connector as defined above; and a plurality of components of a curable liquid material for use therein.

LIST OF FIGURES

Preferred embodiments of the present disclosure will now be described, by way of example only and not in any limitative sense, with reference to the accompanying drawings, in which.

Figure 1:
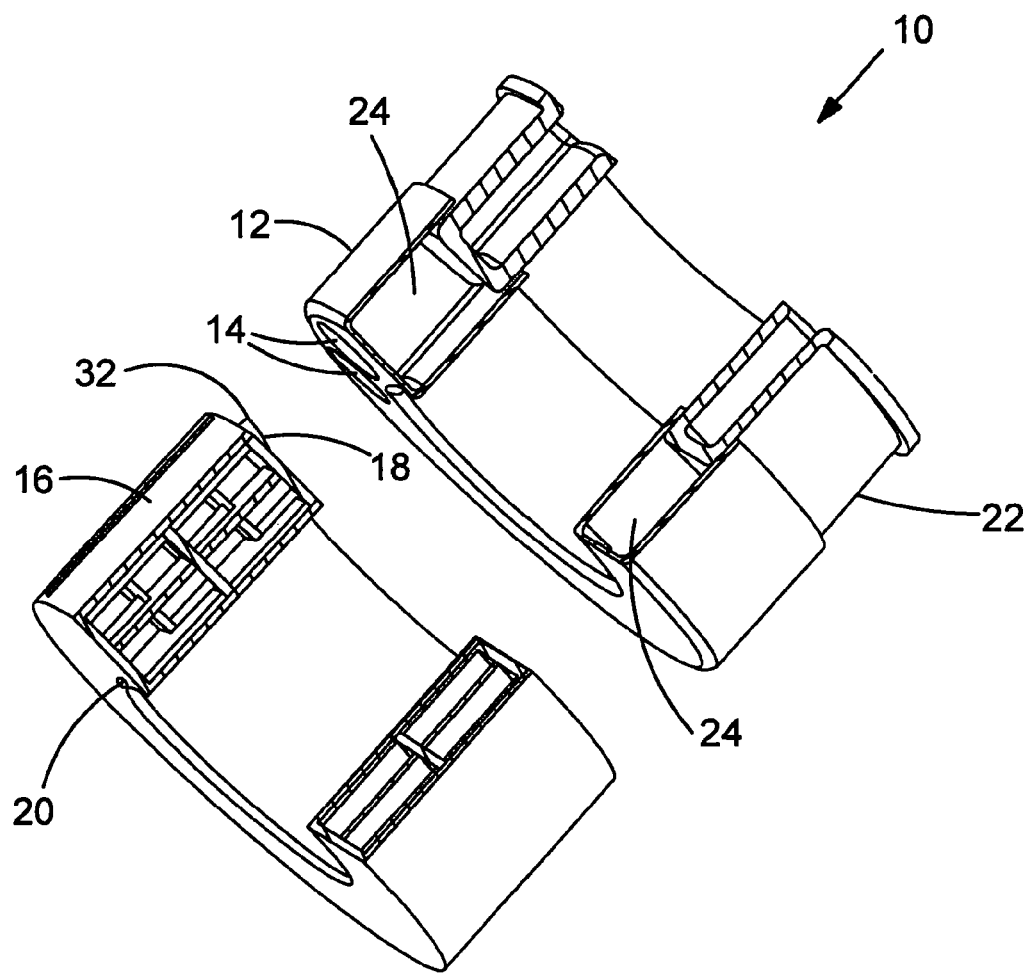
FIG. 1 shows a cutaway view of a dispenser apparatus of a first embodiment of the present disclosure from a first direction before dispensing of curable liquid material.

REFERENCE NUMERALS 10 dispenser apparatus
12 housing
14 first outlet
16 mixing chamber
18 inlet
20 second outlet
22 plunger
23 displacement member
24 storage chamber
26 wall
28 slot
30 membrane
32 protrusion 34 cable gland
36 first part
38 second part
40 annular dam
42 compound tube
44 outer threaded surface
46 inner threaded surface
48 cable
110 dispenser apparatus
112 housing
114 first outlet
124 storage chamber
126 wall

SPECIFIC DESCRIPTION

Referring to FIGS. 1 to 4, a dispenser apparatus 10 of a first embodiment of the disclosure comprises storage means in the form of a housing 12 for separately holding components of a curable liquid material ready for mixing, mixing means in the form of a mixing chamber 16 for receiving and mixing the components together to cause curing of the curable liquid material, and dispensing means in the form of a plunger 22 for urging the components from the housing 12. The plunger 22 urges the components through first outlets 14 and inlets 18, into the mixing chamber 16, out of a second outlet 20 of the mixing chamber 16, and ultimately into an internal space of a connector in the form of a cable gland 34 (FIGS. 9 to 11), wherein the space is defined by a body of the cable gland 34 and an elongate object in the form of a cable 48 extending through the body.

The housing 12 has two first outlets 14 which line up with two inlets 18 of the mixing chamber 16, thereby enabling flow of the components into the mixing chamber 16.

Figure 5:
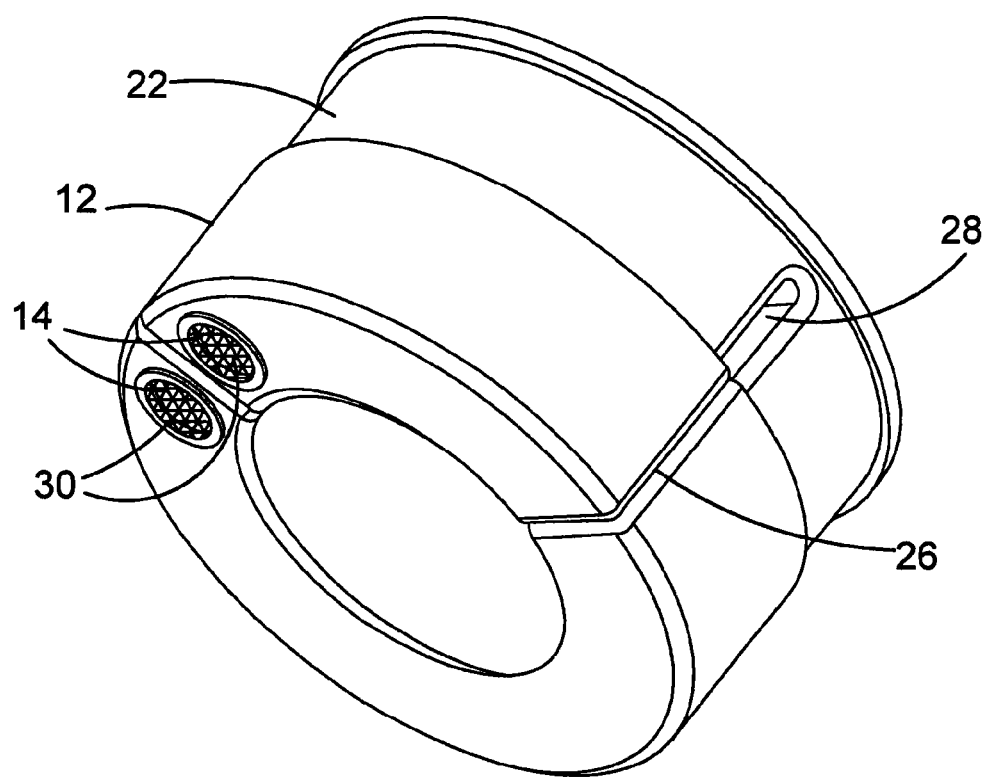
FIG. 5 shows a perspective view of a plunger and a housing of the apparatus of FIG. 1.
Figure 6:
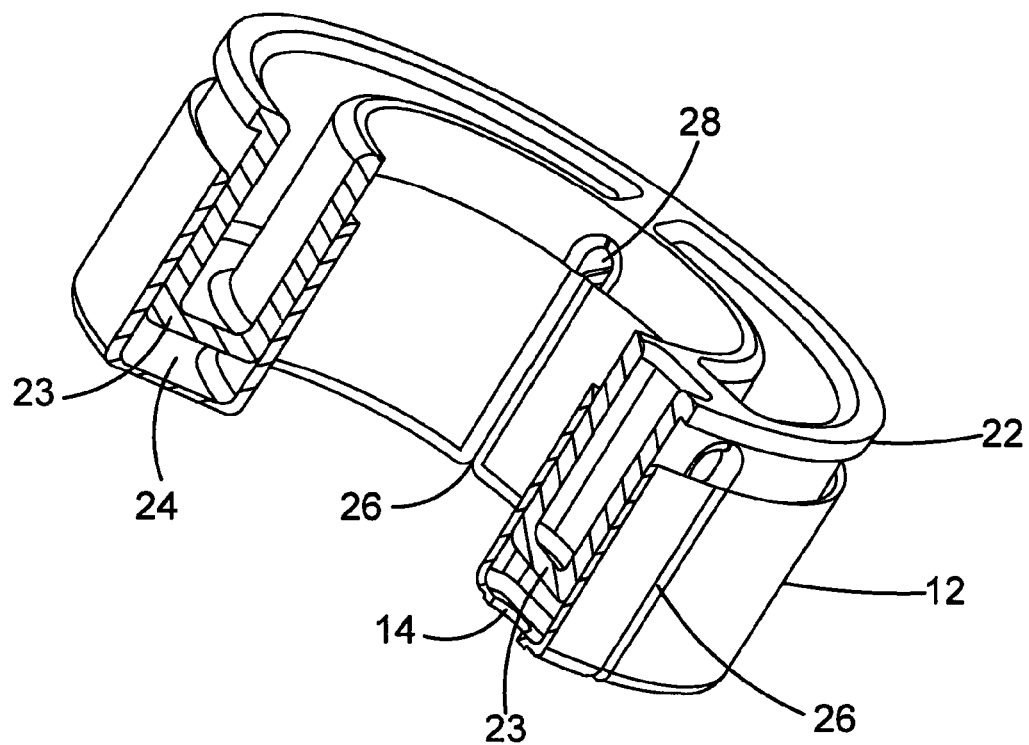
FIG. 6 shows a cutaway view of the plunger and housing of FIG. 5 after dispensing of curable liquid material.

Referring to FIG. 5, the first outlets 14 are shown sealed by barrier means in the form of membranes 30 covering each first outlet 14 to prevent premature or otherwise undesired flow of the components from the housing 12. The membranes 30 also prevent the ingress of moisture or other undesired contaminant into the housing 12.

Figure 2:
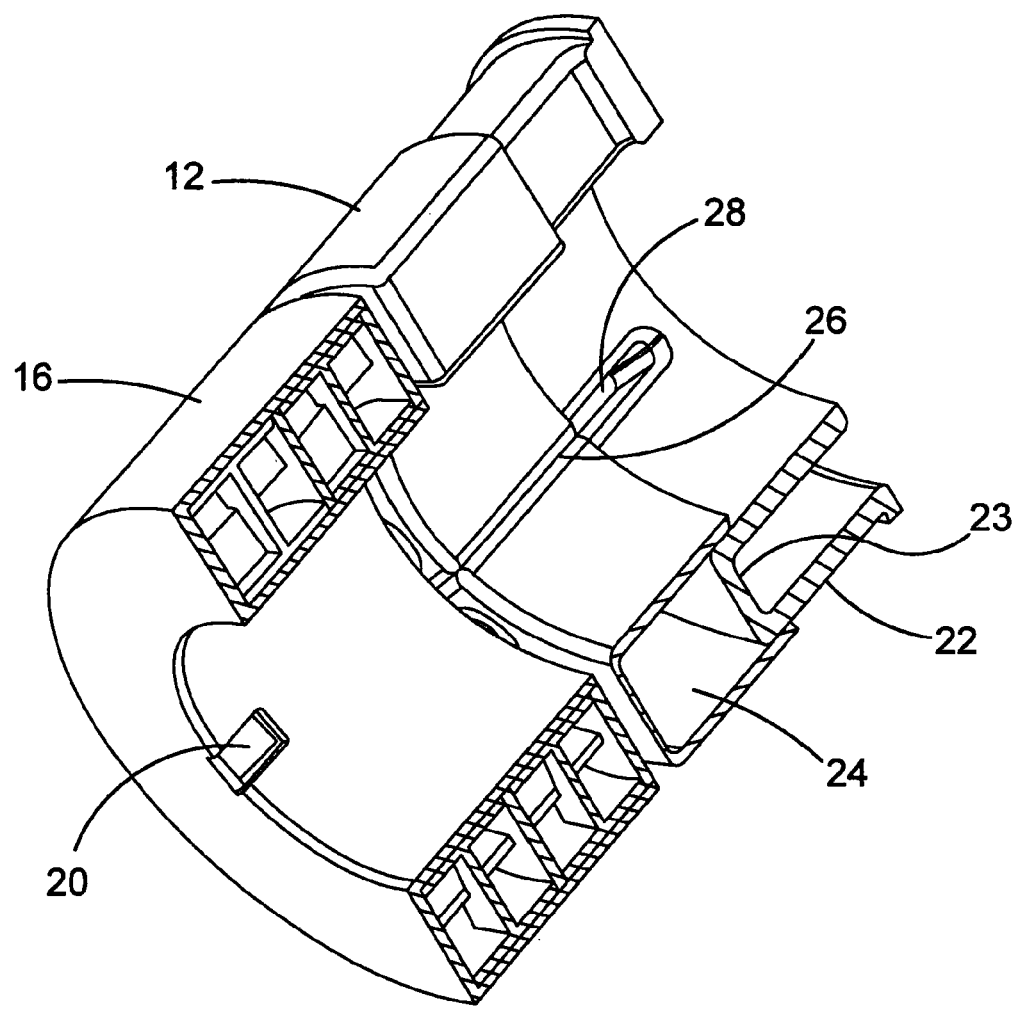
FIG. 2 shows a cutaway view of the apparatus of FIG. 1 from a second direction.
Figure 3:
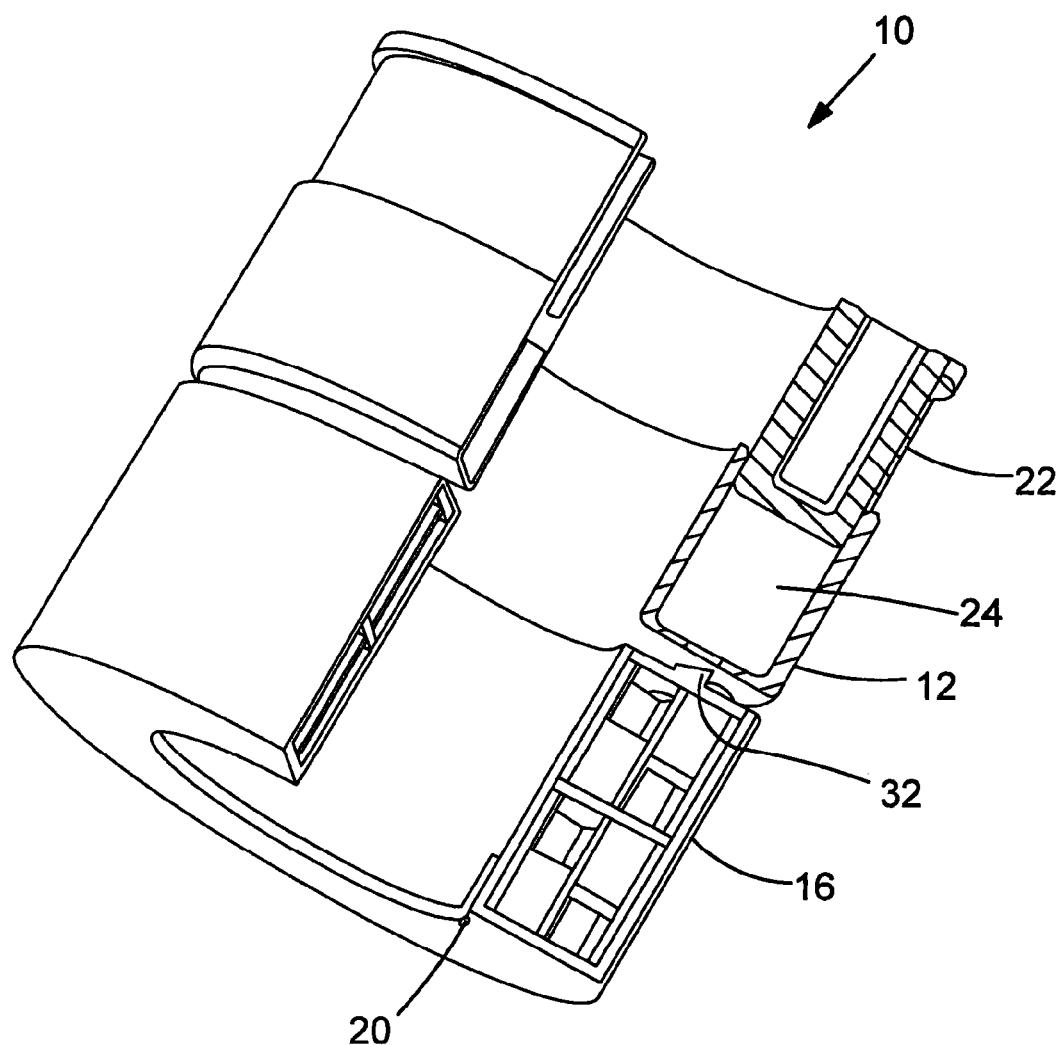
FIG. 3 shows a cutaway view of the apparatus of FIG. 1 from a third direction.
Figure 4:
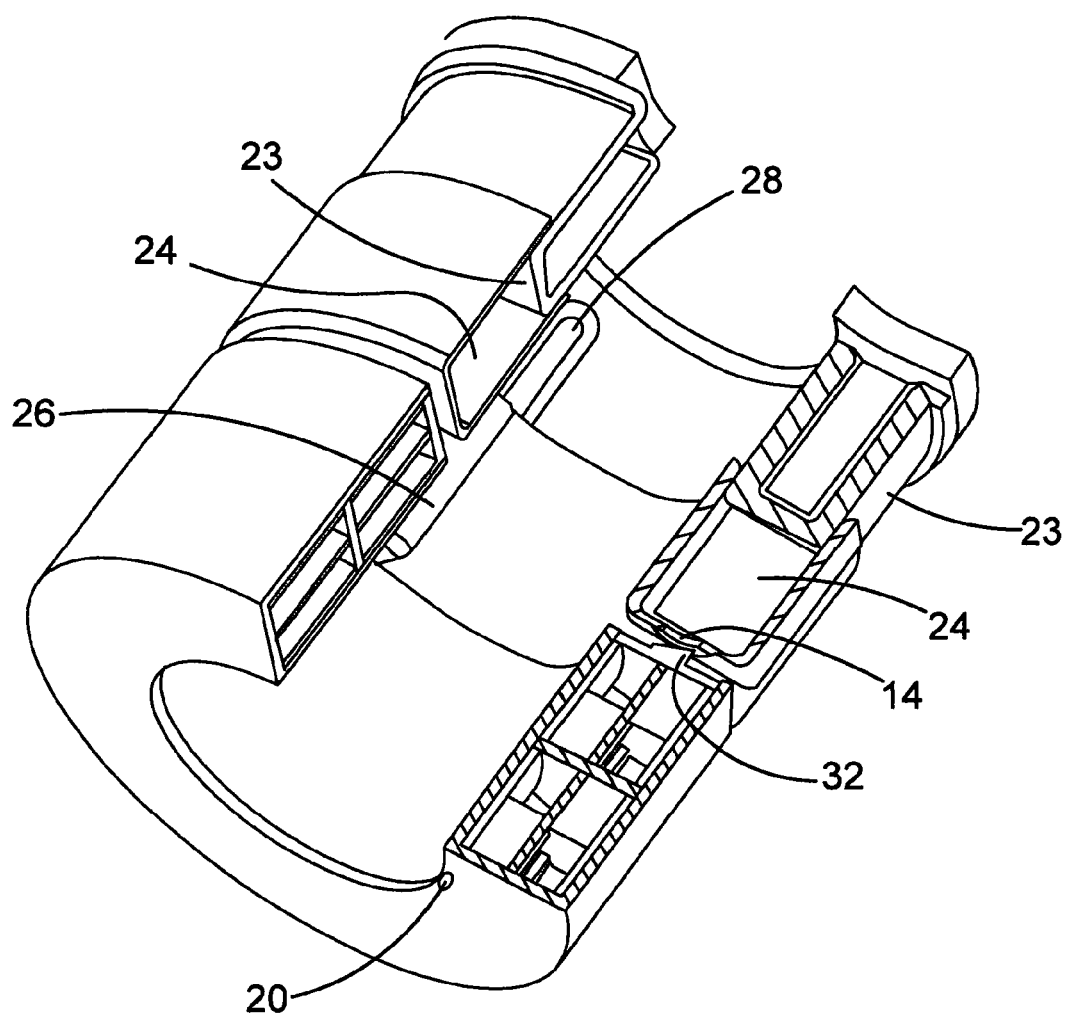
FIG. 4 shows a cutaway view of the apparatus of FIG. 1 from a fourth direction.

As shown more clearly in FIGS. 2 and 5, the housing 12 has two storage chambers 24 separated by walls 26. The plunger 22 has elongate slots 28 slidably receiving the walls 26. The elongate slots enable displacement members in the form of end faces 23 of the plunger 22 to slide into the housing 12 to expel the components of the curable material out of the first outlets 14. Each storage chamber 24 holds a respective component of the curable material and has its own outlet port 14.

The components preferably include a resin and an activator or hardener. Preferably, one storage chamber holds the resin and another storage chamber holds the activator or hardener.

Figure 7:
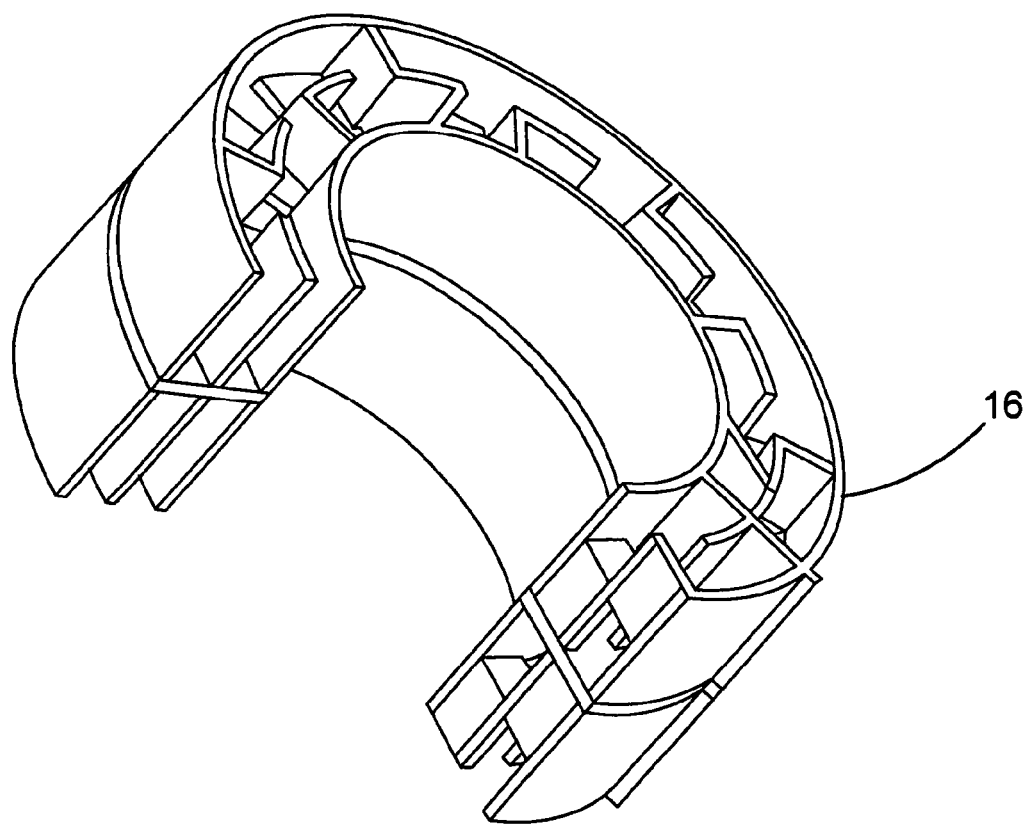
FIG. 7 shows a cutaway view of a mixing chamber of the apparatus of FIG. 1.

Referring to FIG. 7, the mixing chamber 16 has a labyrinthine interior defining tortuous paths between the inlets 18 and the second outlet 20, which enables the components to thoroughly mix with each other prior to being dispensed and therefore enables the supply of a highly homogeneous mixed product into the cable gland interior for optimal curing of the mixed components.

Figure 8:
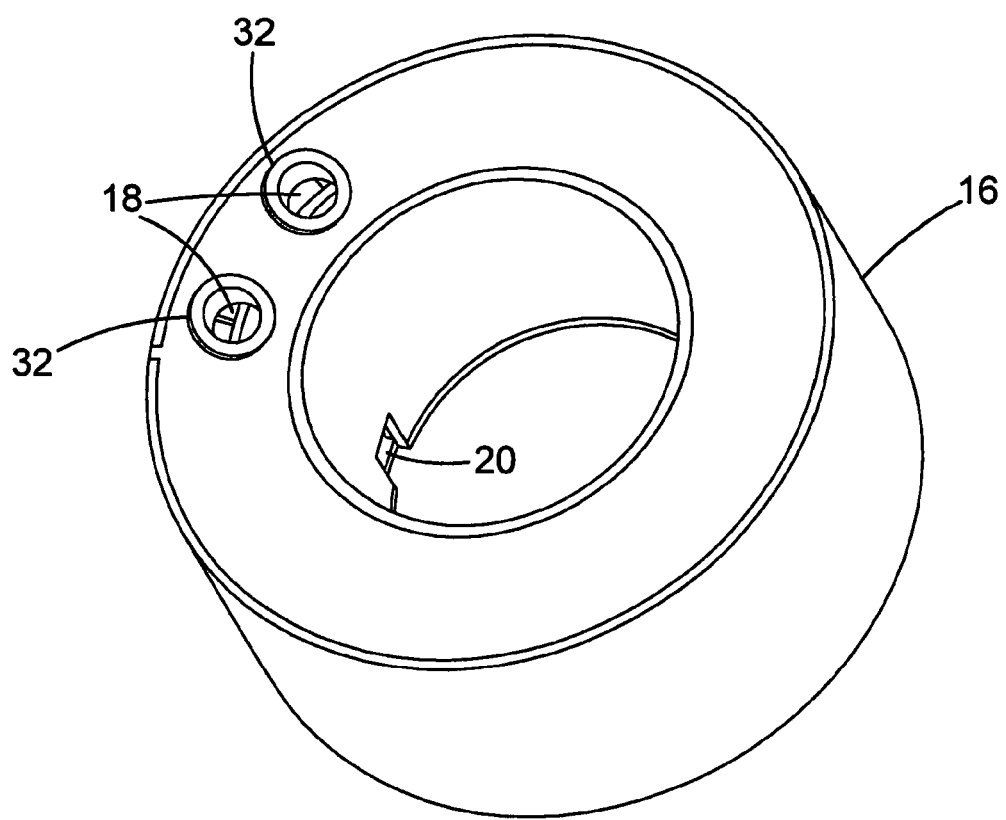
FIG. 8 shows a perspective view of the mixing chamber of FIG. 8.

As shown in FIG. 8, the mixing chamber 16 has access means comprising puncturing means in the form of protrusions 32 arranged around the periphery of inlets 18. Each protrusion 32 has a shape resembling that of an end of a needle, the shape chosen to puncture the membranes 30 when the housing 12 and the mixing chamber 16 are pushed towards one another.

Figure 9:
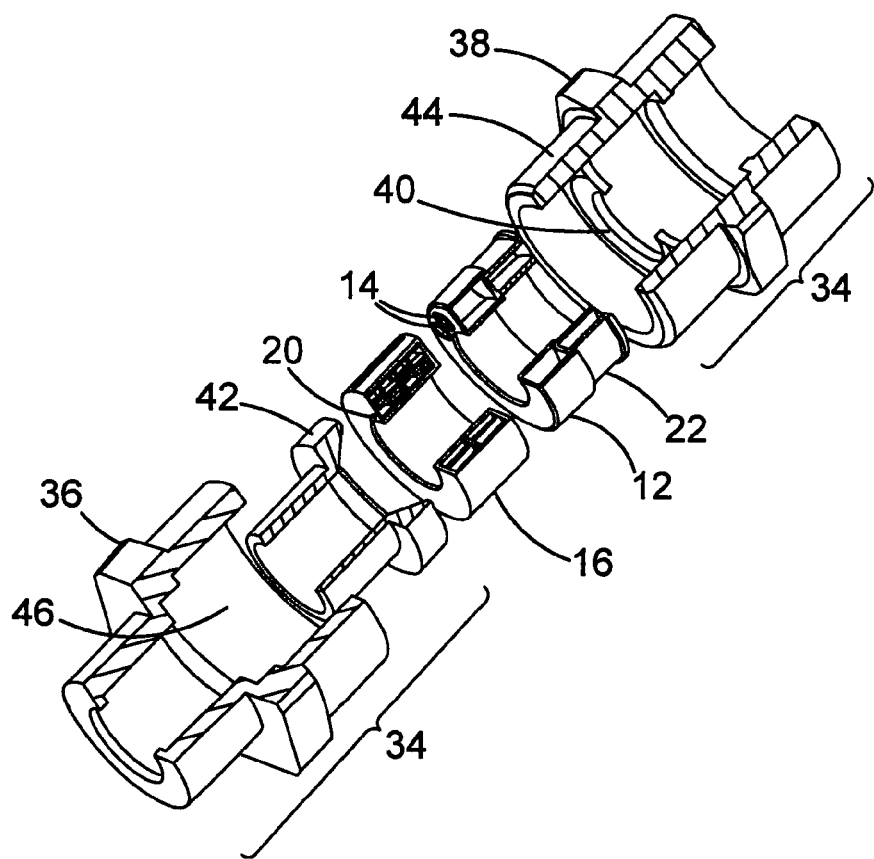
FIG. 9 shows an exploded cutaway view of a cable gland incorporating the apparatus of FIG. 1.
Figure 10:
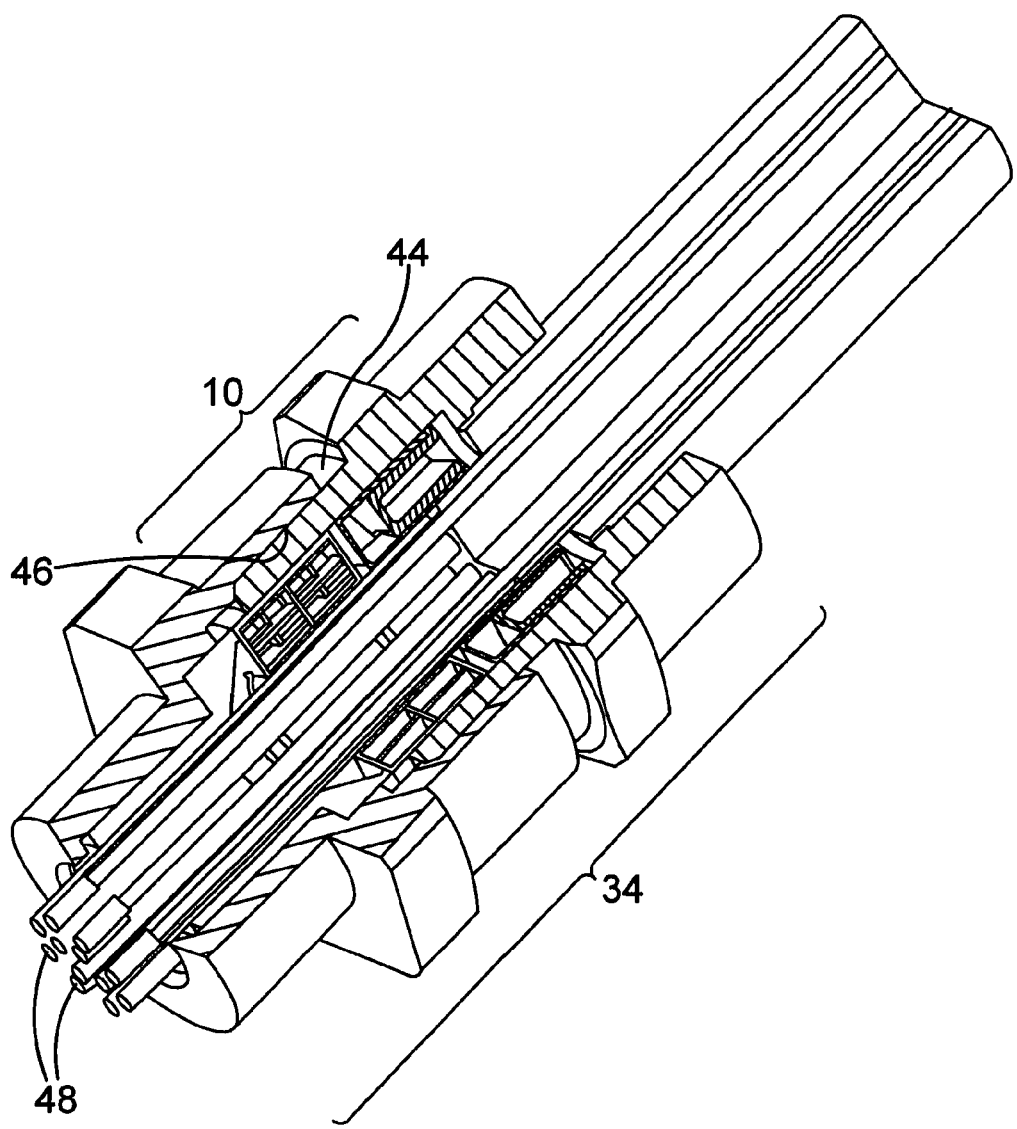
FIG. 10 shows a cutaway view of the cable gland of FIG. 9 in an assembled state mounted to a cable and during dispensing of curable liquid material.
Figure 11:
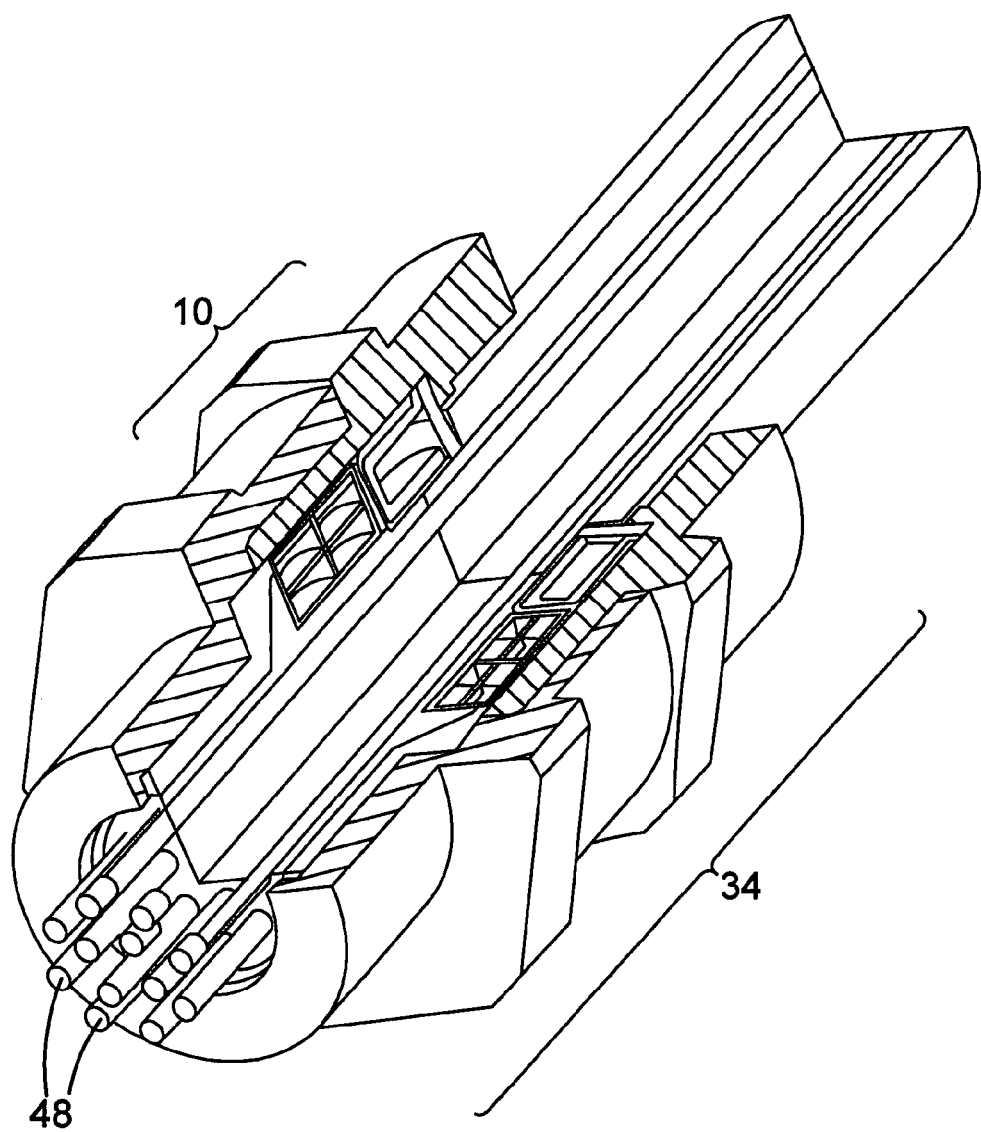
FIG. 11 shows a cutaway view of the cable gland of FIG. 9 after dispensing of curable liquid material.
Figure 12:
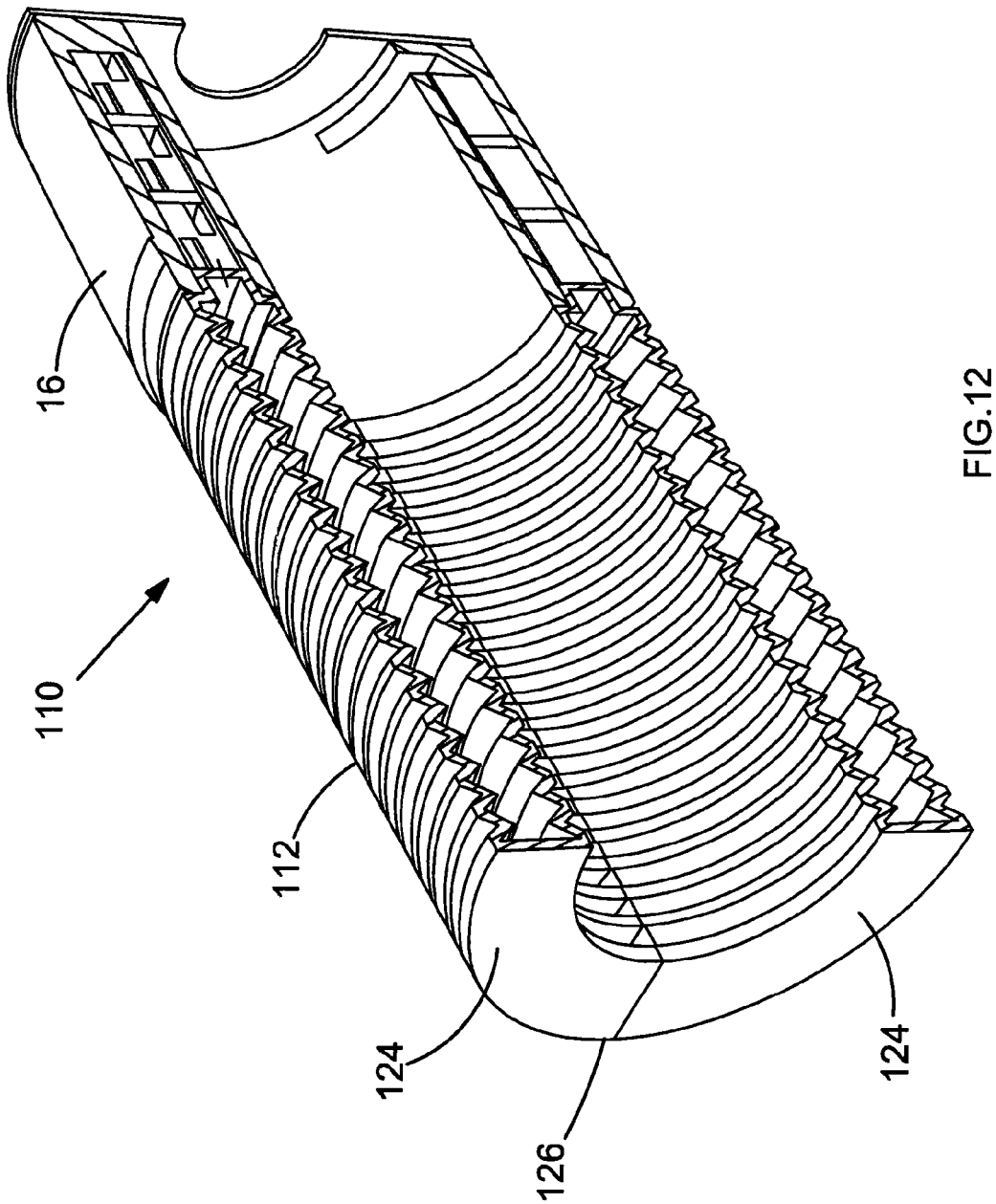
FIG. 12 shows a cutaway view of a dispenser apparatus of a second embodiment of the present disclosure with a housing thereof in an uncompressed state.
Figure 13:
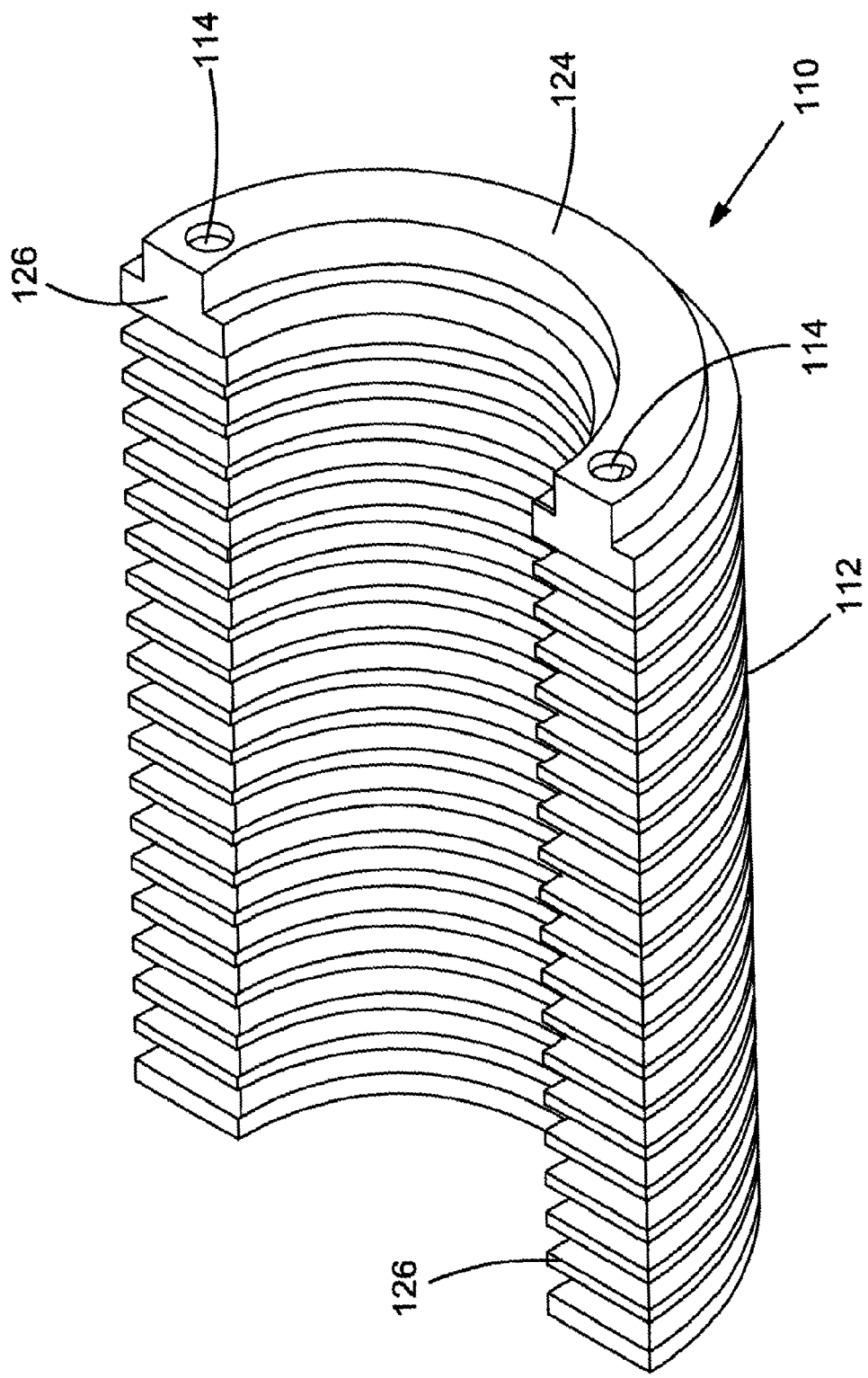
FIG. 13 shows a cutaway view of the housing of the apparatus of FIG. 12.
Figure 14:
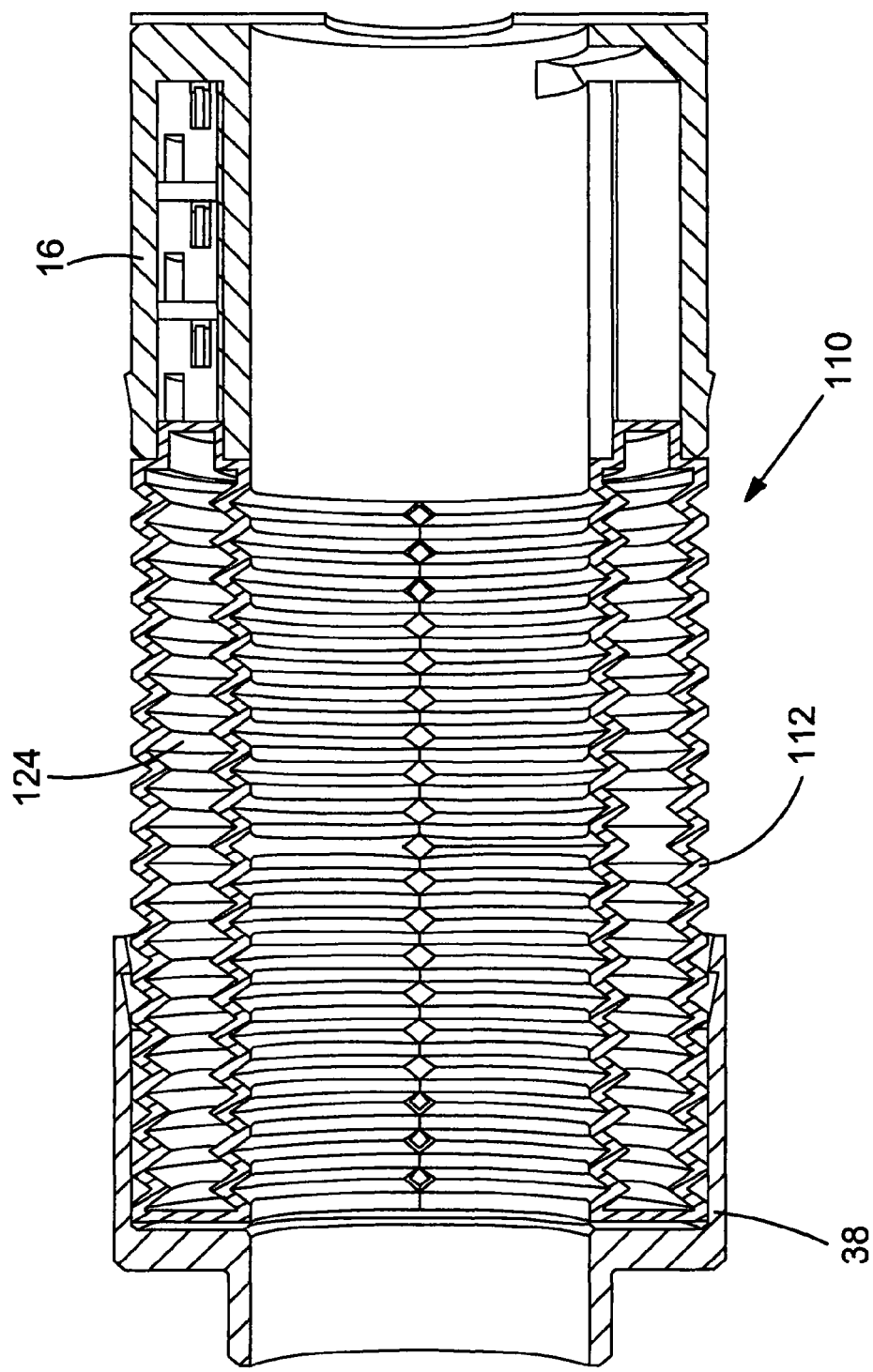
FIG. 14 shows a cutaway view of the apparatus of FIG. 12 located in a second part of a body of a cable gland.
Figure 15:
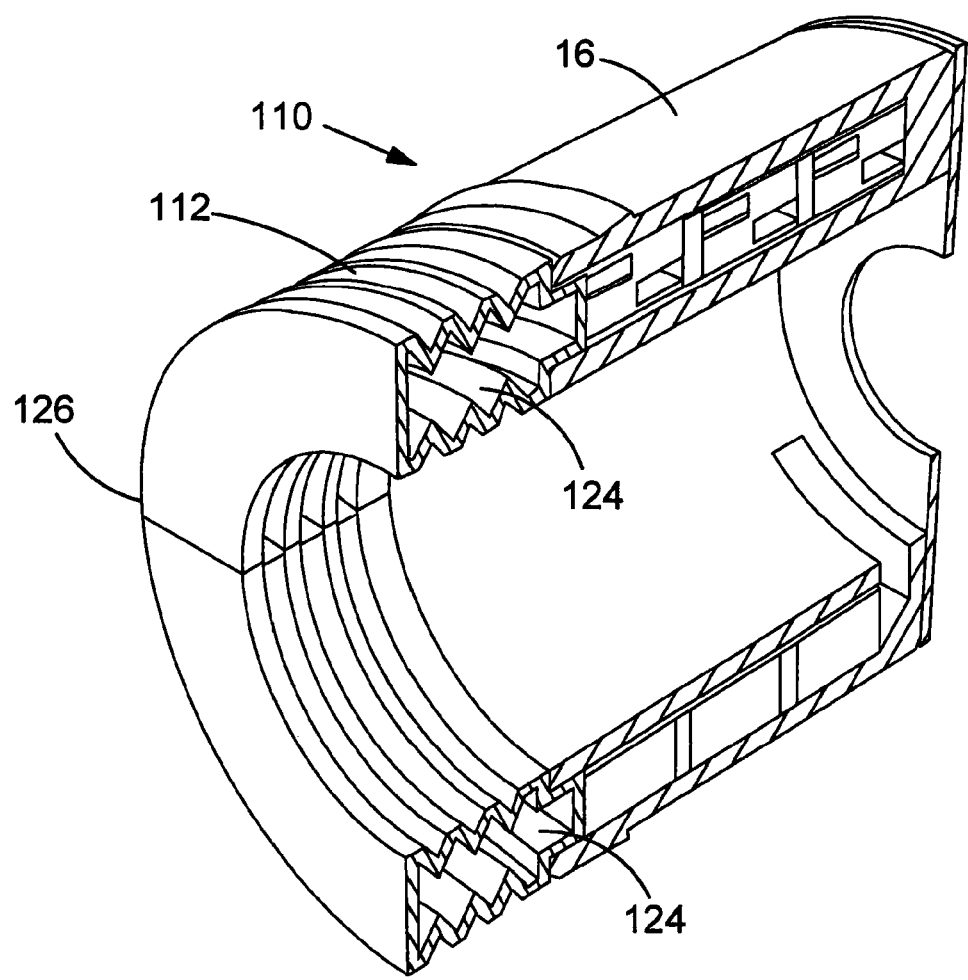
FIG. 15 shows a view corresponding to FIG. 12 of the apparatus with the housing thereof in a compressed state.
Figure 16:
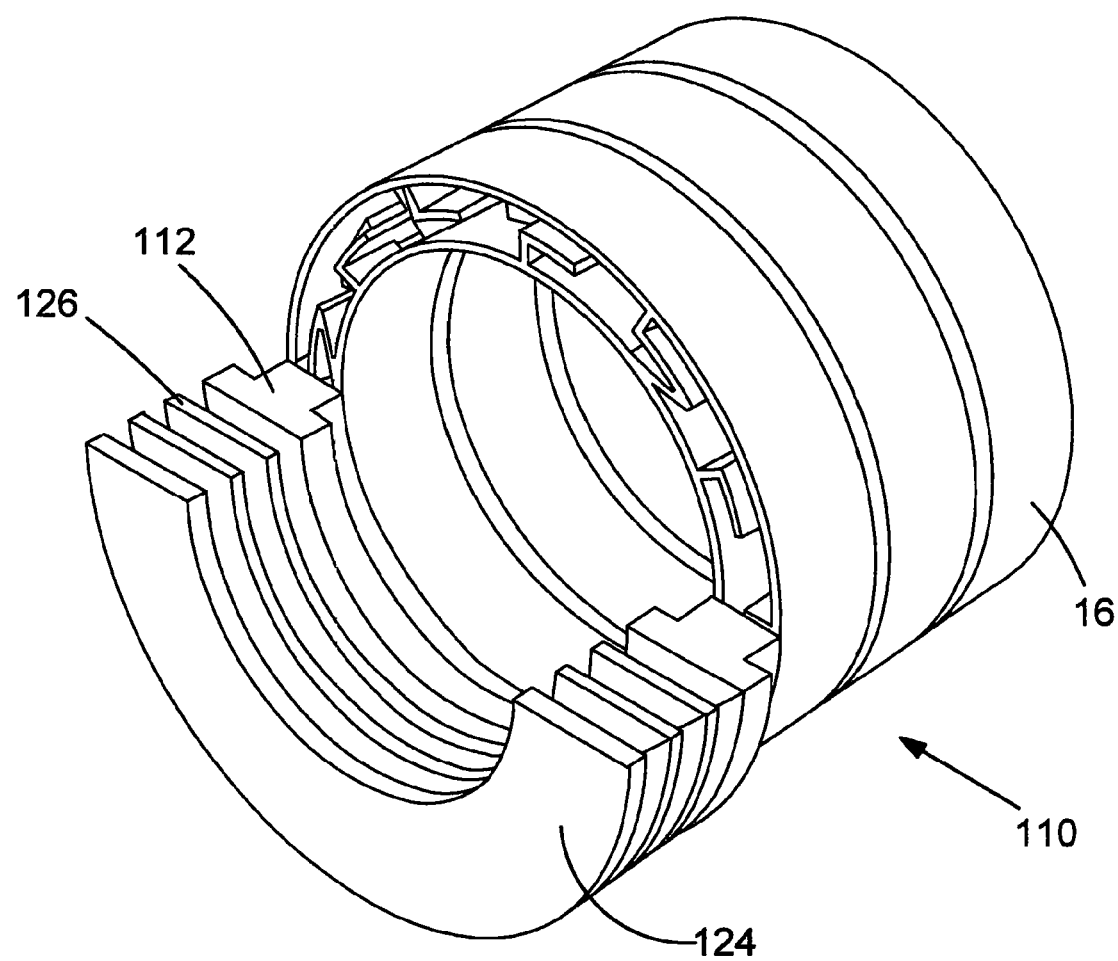
FIG. 16 shows a view corresponding to FIG. 15 with the housing cut away in a horizontal plane.
Figure 17:
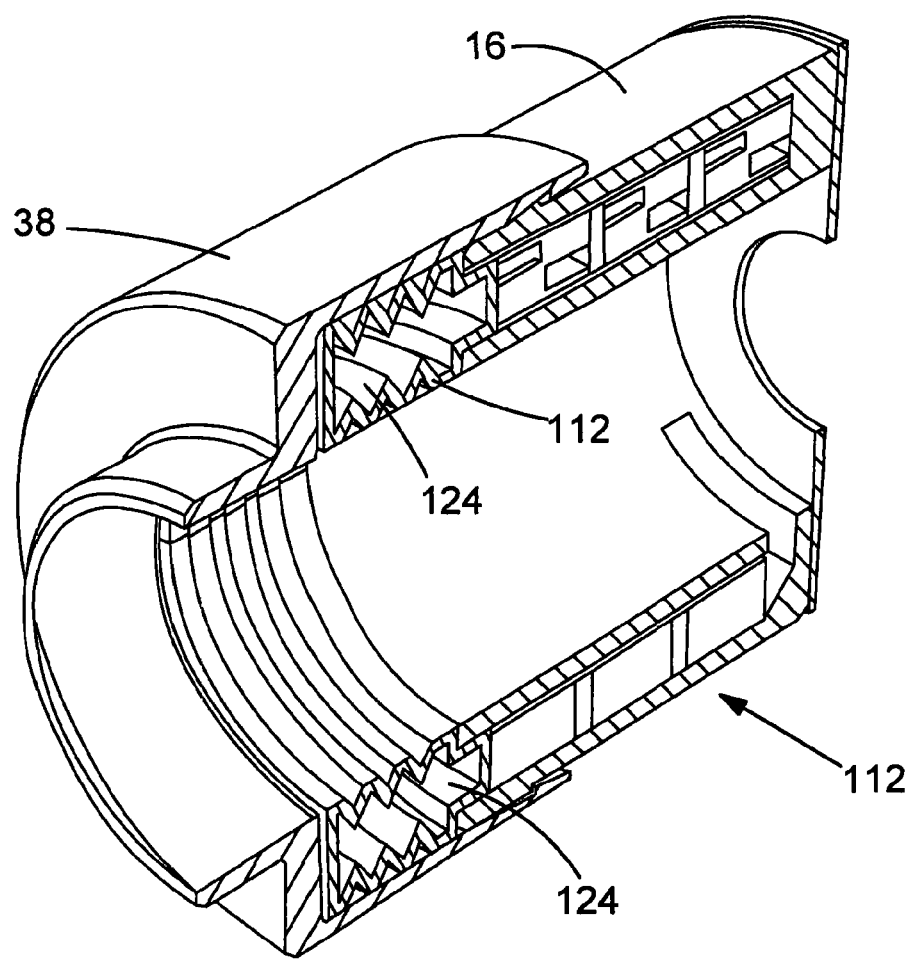
FIG. 17 is a view corresponding to FIG. 15 with the apparatus located in a second part of a body of a cable gland.

FIGS. 9 to 11 show the dispenser apparatus 10 located within a cable gland 34. The body of the cable gland 34 comprises a first part 36 and a second part 38, an annular resin dam 40 arranged within the second part 38, and a compound tube 42. The first part 36 has a threaded inner surface 46 configured to engage with a threaded outer surface 44 of the second part 38 during assembly of the cable gland. The annular resin dam 40 ensures that a minimal quantity of curable material is able to propagate away from a desired curing site. The dam 40 is a diaphragm comprising flexible material for creating a seal around a cable or conductors of a cable extending through the cable gland 34, as can be seen in FIGS. 10 and 11. Additional dams may be provided, for example arranged within the first part 36.

As shown in FIGS. 10 and 11, the cable gland 34 and the dispenser 10 are configured to surround one or more cables 48, and the dispenser 10 is configured to dispense mixed components of the curable material to the internal space of the cable gland 34 and around the cable or conductors of the cable 48 upon assembly of the cable gland 34 together with the dispenser 10.

In use, storage chambers 24 of the housing 12 are supplied with components of curable materials and arranged, together with the plunger 22 and mixing chamber 16, between the first part 36 and second part 38 of the cable gland 34. As the respective threaded surfaces 46, 44 of the first part 36 and second part 38 engage one another, the first part 36 and second part 38 move toward one another. This causes the displacement members 23 of the plunger 22 to slide into the storage chambers 24 of the housing 12, and the housing 12 and mixing chamber 16 to be pushed towards one another, causing the protrusions 32 to puncture the membranes 30. This puncturing action opens the first outlets 14 of the housing to allow the components to flow under urging by the displacement members 23 through the first outlets 14 and into the mixing chamber 16 via its inlets 18. The components flow along the tortuous paths of the labyrinthine interior of the mixing chamber 16 and consequently mix with one another prior to being dispensed into the internal space of the cable gland 34 via the radially-inward directed second outlet 20.

Preferably, the total volume of the components within the housing 12 prior to dispensing is sufficient to fill the mixing chamber 16 and to dispense mixed curable material from the second outlet 20 to fill the internal space of the cable gland 34.

After assembly of the cable gland 34 and the dispenser, and after subsequent tightening together of the first part 36 and second part 38 of the cable gland 34 to cause the dispenser 10 to dispense the mixed curable material, the dispenser 10 remains within the cable gland 34, thereby removing the necessity of disposal of the dispenser 10 and thus reducing waste. Preferably, a quantity of mixed curable materials remains within the mixing chamber 16 and cures to cause the mixing chamber 16 to become a solid unit within the cable gland 34.

Referring to FIGS. 12 to 17, in which parts common to the embodiment of FIGS. 1 to 11 are denoted by like reference numerals but increased by 100, a dispenser apparatus 110 of a second embodiment of the disclosure comprises storage means in the form of a housing 112 which is arranged to surround a cable and defines a pair of storage chambers 124 separated by walls 126. Each storage chamber 124 has a respective first outlet 114 which aligns with inlets 18 of a mixing chamber 16 which is identical in construction to the mixing chamber 16 of the embodiment of FIGS. 1 to 11.

The housing 112 has a bellows-like construction in a plane containing the longitudinal axis of the generally cylindrical housing 112, and is compressed in an axial direction by engagement of the respective threaded surfaces 46, 44 of the first part 36 and second part 38 of the cable gland 34 to cause axial compression of the housing 112 to displace the two components of the curable material into the mixing chamber 16. This enables a shorter overall length of cable gland to be achieved.

It will be appreciated by persons skilled in the art that the above embodiments have been described by way of example only and not in any limitative sense, and that various alterations and modifications are possible without departure from the scope of the disclosure as defined by the appended claims. For example, instead of puncturing membranes 30 of the housing by means of protrusions 32, the membranes 30 can be arranged to burst as a result of pressure applied to the components of curable material as the first 36 and second parts 38 of the cable gland 34 engage each other and move towards each other.

The invention claimed is:

1. A connector, comprising:
a body including a first part and a second part, wherein the first part is mountable to the second part; and
a dispenser apparatus for dispensing curable liquid material into a space between the connector and an elongate object extending through the connector, the dispenser apparatus comprising:
at least one storage device for separately storing a plurality of components of a curable liquid material and comprising a plurality of storage chambers each adapted to store a respective component and provided with a respective first outlet for said component; and
at least one mixing device for mixing the components to cause curing of the curable liquid material and comprising at least one inlet for receiving the components from the first outlets, and at least one second outlet for the mixed components;
wherein the dispenser apparatus is adapted to be located in the body such that the mixed components are dispensable from at least one said second outlet into the space defined by the body and the elongate object extending through the body, and is adapted to dispense the mixed components into the space as a result of mounting the first part to the second part.

2. The connector of claim 1, wherein at least one said storage device is compressible as a result of mounting the first part to the second part of the body.

3. The connector of claim 2, wherein at least one said storage device is compressible in an axial direction of the connector.

4. The connector according to claim 1, wherein at least part of at least one said storage device has a bellows-like cross section in a plane including a longitudinal axis of the connector.

5. The connector of claim 1, further comprising at least one dispenser device for urging the components out of the storage chambers via the first outlets and into at least one said mixing device via at least one said inlet.

6. The connector of claim 5, wherein at least one said dispenser device comprises at least one displacement member slidably located in a respective storage chamber and adapted to move relative to the chamber as a result of mounting the first part to the second, to displace a component in the chamber out of the respective said first outlet.

7. The connector of claim 1, wherein at least one said mixing device comprises a labyrinthine structure presenting a tortuous path to the components between at least one said inlet and at least one said second outlet.

8. The connector of claim 1, wherein at least one said mixing device is adapted to be at least partially filled with curable liquid material after dispensing of the mixed components from at least one said second outlet.

9. The connector of claim 1, further comprising an aperture therethrough for receiving an elongate object.

10. The connector of claim 1, wherein the relative volumes of the storage chambers are arranged in proportion to volumes of respective components required for a desired mixing ratio of the components.

11. The connector of claim 1, wherein the dispenser apparatus further comprising at least one barrier device for preventing flow of fluid through at least one first outlet, and at least one access device for enabling flow of fluid through at least one said first outlet.

12. The connector of claim 11, wherein at least one said barrier device comprises at least one membrane.

13. The connector of claim 12, wherein at least one said membrane is adapted to burst as a result of mounting the first part to the second part.

14. The connector of claim 11, wherein at least one said access device comprises at least one puncturing device for puncturing at least one said barrier device.

15. The connector of claim 14, wherein at least one said puncturing device comprises at least one protrusion arranged around a periphery of an inlet.

16. The connector of claim 1, wherein at least one said second outlet is arranged to dispense the mixed curable components into the space in a radially-inward direction.

17. The connector of claim 1, wherein the first part is threadably mountable to the second part.

18. The connector according to claim 1, wherein the connector is a cable gland.

19. A connector assembly, comprising: a connector according to claim 1; and a plurality of components of a curable liquid material for use therein.

* * * * *